US009610798B2

(12) United States Patent
Allred et al.

(10) Patent No.: US 9,610,798 B2
(45) Date of Patent: Apr. 4, 2017

(54) TROPHY MOUNT AND SKULL CLAMP

(71) Applicant: Typical 4 LLC, West Valley, UT (US)

(72) Inventors: Eric Allred, West Jordan, UT (US);
Brian Allred, West Valley, UT (US)

(73) Assignee: Typical 4, LLC, West Valley City, UT (US)

(*) Notice: Subject to any disclaimer, the term of this patent is extended or adjusted under 35 U.S.C. 154(b) by 158 days.

(21) Appl. No.: 14/184,595

(22) Filed: Feb. 19, 2014

(65) Prior Publication Data
US 2014/0230220 A1    Aug. 21, 2014

Related U.S. Application Data

(60) Provisional application No. 61/767,106, filed on Feb. 20, 2013.

(51) Int. Cl.
*B44C 5/02* (2006.01)
*G09B 23/36* (2006.01)
*A47F 5/08* (2006.01)

(52) U.S. Cl.
CPC .......... *B44C 5/02* (2013.01); *A47F 5/08* (2013.01); *G09B 23/36* (2013.01); *Y10T 29/49826* (2015.01)

(58) Field of Classification Search
CPC .............. B44C 5/02; A47F 5/08; G09B 23/36
USPC .......... 248/316.5, 316.6, 481, 181.1, 288.31, 248/181.2, 314; 403/143, 141; 452/189, 452/190
See application file for complete search history.

(56) References Cited

U.S. PATENT DOCUMENTS

| | | | | |
|---|---|---|---|---|
| 892,105 A | * | 6/1908 | White | F16L 3/202 |
| | | | | 122/510 |
| 908,751 A | * | 1/1909 | Cooke | A47B 57/42 |
| | | | | 248/224.8 |
| 1,280,013 A | * | 9/1918 | Goddard | F16M 11/14 |
| | | | | 248/181.1 |
| 1,722,773 A | * | 7/1929 | Stewart | F21L 14/00 |
| | | | | 248/229.16 |
| 1,895,156 A | * | 1/1933 | Fisher | B01L 9/50 |
| | | | | 248/122.1 |

(Continued)

FOREIGN PATENT DOCUMENTS

| | | | | |
|---|---|---|---|---|
| CA | 2307935 A1 | * | 2/2001 | ............. A47B 96/07 |
| DE | 102007047563 B3 | * | 10/2008 | ............... B44C 5/02 |

OTHER PUBLICATIONS

Euro Mounter Ltd, "Euro Mounter", http://www.euromounter.com, 2014, 1 page.

(Continued)

*Primary Examiner* — Eret McNichols
(74) *Attorney, Agent, or Firm* — Atlas Intellectual Property Law; Travis Banta

(57) ABSTRACT

A trophy mount and a skull clamp are disclosed. The trophy mount can comprise a skull coupling feature configured to interface with and support a skull, and a positioning device configured to provide rotation of the skull coupling feature in at least two rotational degrees of freedom to facilitate positioning of the skull. The skull clamp can comprise a first jaw configured to extend into a foramen magnum of an occipital bone of a skull toward a nose end of the skull, and a second jaw operable with the first jaw to clamp the occipital bone and secure a bottom of the skull.

16 Claims, 10 Drawing Sheets

(56) References Cited

U.S. PATENT DOCUMENTS

| | | | | |
|---|---|---|---|---|
| 2,019,789 A * | 11/1935 | Mahannah | B25B 5/006 224/42.4 |
| 2,533,867 A * | 12/1950 | Zink | B60R 1/078 248/276.1 |
| 2,721,719 A * | 10/1955 | Giese | E04H 12/24 248/219.4 |
| 3,428,306 A * | 2/1969 | Harrison | B25B 5/04 269/218 |
| 3,689,687 A * | 9/1972 | Bosch | H01B 17/56 174/161 R |
| 3,843,083 A * | 10/1974 | Angibaud | A45F 5/00 248/229.14 |
| 3,893,813 A * | 7/1975 | Johnson | B01L 9/50 24/504 |
| 4,225,106 A * | 9/1980 | Eplan | A45D 20/12 219/242 |
| 4,307,864 A * | 12/1981 | Benoit | A45F 5/00 248/222.11 |
| 4,461,439 A * | 7/1984 | Rose | A45D 20/16 248/288.31 |
| 4,464,440 A * | 8/1984 | Dotzman | B44C 5/02 428/16 |
| 4,950,273 A * | 8/1990 | Briggs | A61B 17/2833 30/251 |
| 5,037,052 A * | 8/1991 | Crisp | A01M 31/025 248/229.23 |
| 5,334,354 A * | 8/1994 | Johnston | B01L 9/50 16/304 |
| 5,595,094 A * | 1/1997 | Negus | B25B 7/02 81/3.44 |
| 5,667,185 A * | 9/1997 | Maglica | B62J 6/00 248/223.41 |
| 6,828,035 B1 * | 12/2004 | Goettl | B44C 5/02 211/103 |
| 6,915,996 B2 * | 7/2005 | Lin | F16C 11/06 248/288.31 |
| 7,243,888 B2 * | 7/2007 | Peek | G09B 23/36 248/304 |
| 7,832,697 B2 * | 11/2010 | West | A45D 20/12 248/176.1 |
| 8,103,155 B2 * | 1/2012 | Dannenberg | A45D 20/12 392/379 |
| D696,565 S * | 12/2013 | Huang | D8/22 |
| D736,579 S * | 8/2015 | Hauser | D8/34 |
| 9,248,696 B2 * | 2/2016 | Maria | B44C 5/02 |
| 9,273,821 B2 * | 3/2016 | Chang | F16M 13/00 |
| 2006/0154224 A1 * | 7/2006 | St.Ama | G09B 23/36 434/296 |
| 2009/0026347 A1 * | 1/2009 | Noon | B44C 5/02 248/684 |
| 2011/0031363 A1 | 2/2011 | Shaw | |
| 2011/0036959 A1 * | 2/2011 | Raby | B44C 5/02 248/282.1 |
| 2012/0107634 A1 | 5/2012 | Swarthout | |
| 2013/0126689 A1 * | 5/2013 | Richards | A47F 5/0087 248/288.31 |
| 2013/0215617 A1 * | 8/2013 | Carroll | F21V 33/0028 362/253 |
| 2014/0307424 A1 * | 10/2014 | Carroll | B44C 5/02 362/124 |
| 2015/0076731 A1 * | 3/2015 | Walton, Jr. | B44C 5/02 264/242 |
| 2015/0258844 A1 * | 9/2015 | Byrns | B44C 5/02 428/18 |

OTHER PUBLICATIONS

Heads of State, "Turn Your Trophy into Art", www.headsofstatepanels.com, 2013, 2 pages.
Racked-Out, "Racked-Out Elite Mounting Systems", www.facebook.com/Racked-Out-elite-systems-209249725760062/, 2008, 2 pages.
Skullhooker, "About SkullHooker", http://www.skullhooker.com/about/, 2010, 4 pages.
Texas European Mounts, "Texas European Mounts", http://www.texaseuropeanamounts.com, 2009, 2 pages.
The Taxidermists' Woodshop, "The Taxidermists' Woodshop", http://www.taxidermistwoodshop.com, Oct. 2009, 2 pages.
Trophy Metal, "Trophy Metal Wildlife Metal Art and More", http://www.trophymetal.com, 2012, 6 pages.

* cited by examiner

US 9,610,798 B2

TROPHY MOUNT AND SKULL CLAMP

RELATED APPLICATIONS

This application claims the benefit of U.S. Provisional Application No. 61/767,106, filed Feb. 20, 2013, which is incorporated by reference herein in its entirety.

BACKGROUND

It is common to display animal trophies, such as heads of deer or elk, on walls in order to commemorate a hunt or preserve memories. Often, such trophies are custom mounted with fittings made for a specific animal trophy. Some mountings even offer the flexibility to accept or accommodate a variety of animals.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
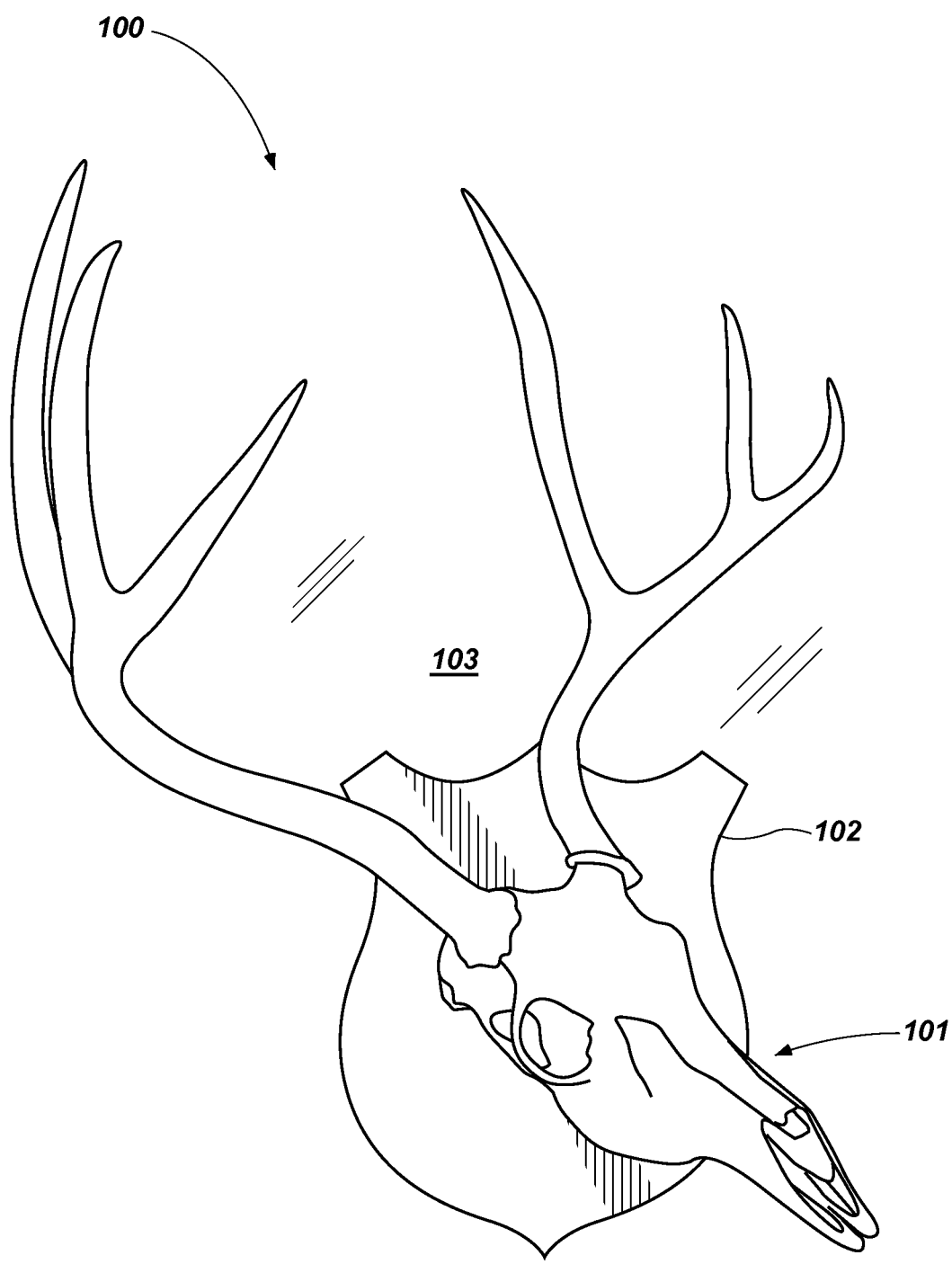
FIG. 1 is an example illustration of a trophy mount system in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although some mountings can adapt to a variety of animal trophies, typically, such mountings are not secure and the animal trophy merely rests on a support and can be easily dislodged. In addition, mountings typically do not facilitate multiple mounting positions or orientations, and those that do offer only limited or cumbersome adjustment options.

Accordingly, a trophy mount for animals is disclosed that facilitates a secure coupling with an animal trophy that can accommodate a wide variety of different animal types and/or sizes. In one aspect, the trophy mount facilitates multiple mounting positions and orientations. The trophy mount can include a skull coupling feature configured to interface with and support a skull, and a positioning device configured to provide rotation of the skull coupling feature in at least two rotational degrees of freedom to facilitate positioning of the skull.

In one aspect, a skull coupling feature in the form of, or comprising, a skull clamp is disclosed that can include a first jaw configured to extend into a foramen magnum of an occipital bone of a skull toward a nose end of the skull, and a second jaw operable with the first jaw to clamp the occipital bone and secure a bottom of the skull.

In another aspect, a trophy mount is disclosed that can comprise an extension arm rotatably attachable to a base, a skull clamp supported by the extension arm and having a first jaw configured to extend into a foramen magnum of an occipital bone of a skull toward a nose end of the skull, and a second jaw operable with the first jaw to clamp the occipital bone and secure a bottom of the skull, and a positioning device configured to provide rotation of the skull clamp relative to the extension arm in at least two rotational degrees of freedom to facilitate positioning of the skull.

One embodiment of a trophy mount system 100 is illustrated in FIG. 1. The trophy mount system 100 can include a trophy, such as a skull 101 or head of an animal (i.e., deer, elk, moose, ram, cougar, boar, etc.). The trophy mount system 100 can have a base 102 to support and display the skull 101. The base 102 can be attached to a wall 103 or be configured to rest upon or be supported by a table or other horizontal surface. The base 102 can be formed of any material capable of supporting the skull 101 and the other components of the trophy mount system 100. As described herein, the trophy mount system 100 can facilitate securing the skull 101 and/or facilitate a wide variety of display orientations and positions for the skull 101.

For example, the trophy mount system 100 can comprise a trophy mount 110, as shown in FIGS. 2A-2D, which can be configured to securely clamp the skull 101, as well as enable movement of the skull 101 in multiple degrees of freedom. In one aspect, the trophy mount 110 can include an extension arm 120 attachable to the base 102, for example, by a bracket 121. In some embodiments, the extension arm 120 can be rotatably attachable to the base 102. For example, the extension arm 120 can be rotatable about axis 104 relative to the bracket 121, which can be fixedly attached to the base, such as by one or more fasteners.

The trophy mount 110 can also include a skull coupling feature or clamp 130 supported about any type of support structure or mount, such as by the extension arm 120 and base 102, although these are not intended to be limiting in any way as the skull coupling feature can be supported by a number of different types of support structures or mounts, and configured to interface with and support the skull 101. In one aspect, the skull coupling feature 130 can comprise a skull clamp, as discussed in more detail hereinafter. The trophy mount 110 can further include a positioning device 140 configured to provide rotation of the skull coupling feature 130 relative to the base, or in this case the extension arm 120, in at least two rotational degrees of freedom to facilitate positioning of the skull 101. In some embodiments, the positioning device 140 can comprise a ball 141 and a socket 142 to provide rotational movement in three degrees of freedom about axes 105a, 105b, 105c, wherein an infinite number of adjustment positions along these axes can be obtained (i.e., provides for infinite rather than non-discrete positioning). In other embodiments, multiple single degree of freedom joints can be combined to provide movement in two or more rotational degrees of freedom.

Additionally, in some embodiments, the trophy mount 110 can include a light 150 configured to be disposed inside the trophy, such as the skull 101. The light 150 can be electrically coupled via wires 151 to a power source, such as a battery 152 associated with the base 102 and/or an AC outlet. The light can be of any suitable type and/or color, can be associated with one or more lighting effects control elements (e.g., that provides blinking, strobe, dimming and other lighting features or effects), and can be used to provide different visual effects associated with the trophy.

Figure 2A:
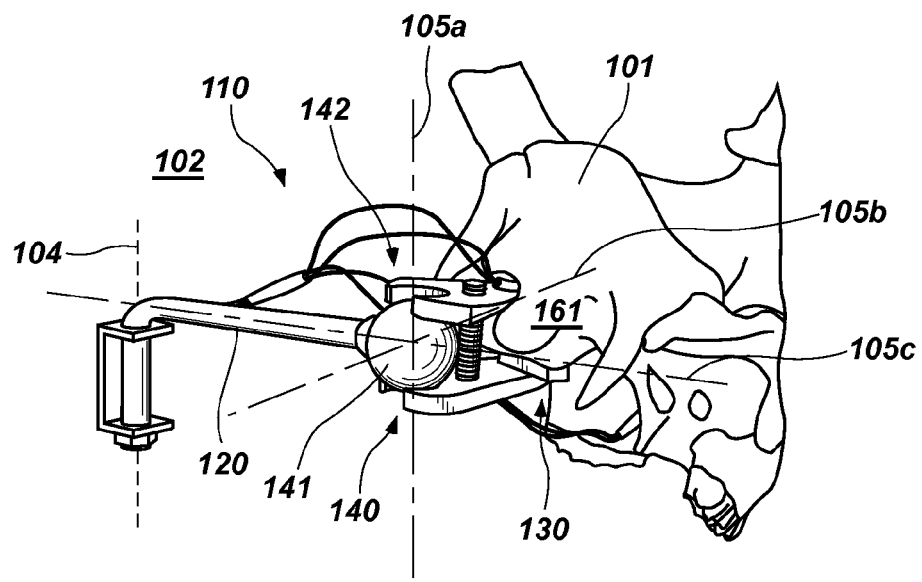
FIGS. 2A-2D are close-up views of a trophy mount of the trophy mount system of FIG. 1, in accordance with an embodiment of the present invention.
Figure 2B:
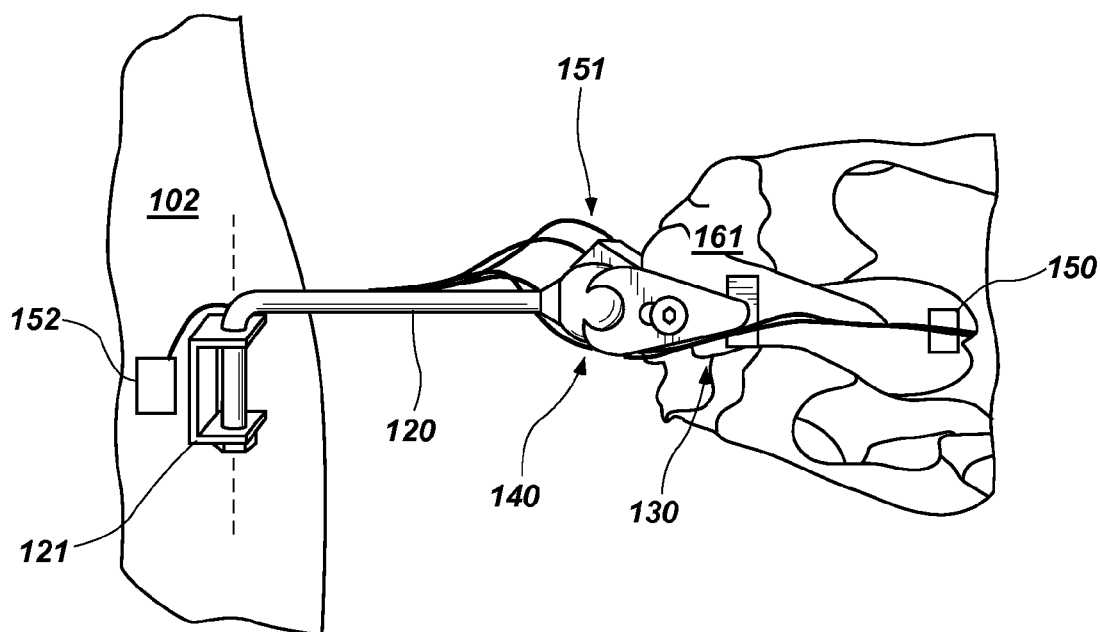
Figure 2C:
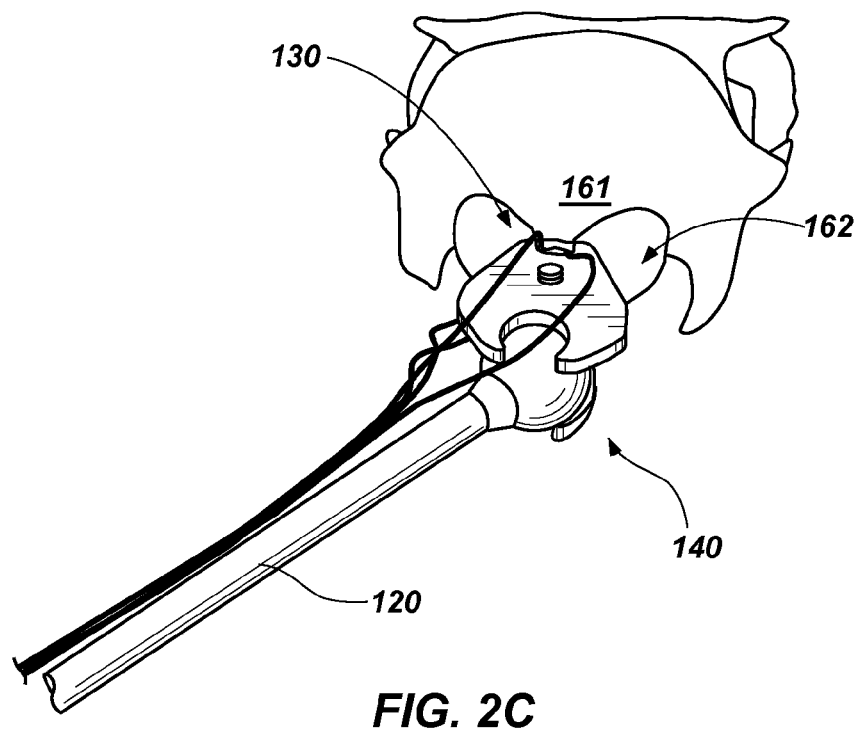
Figure 2D:
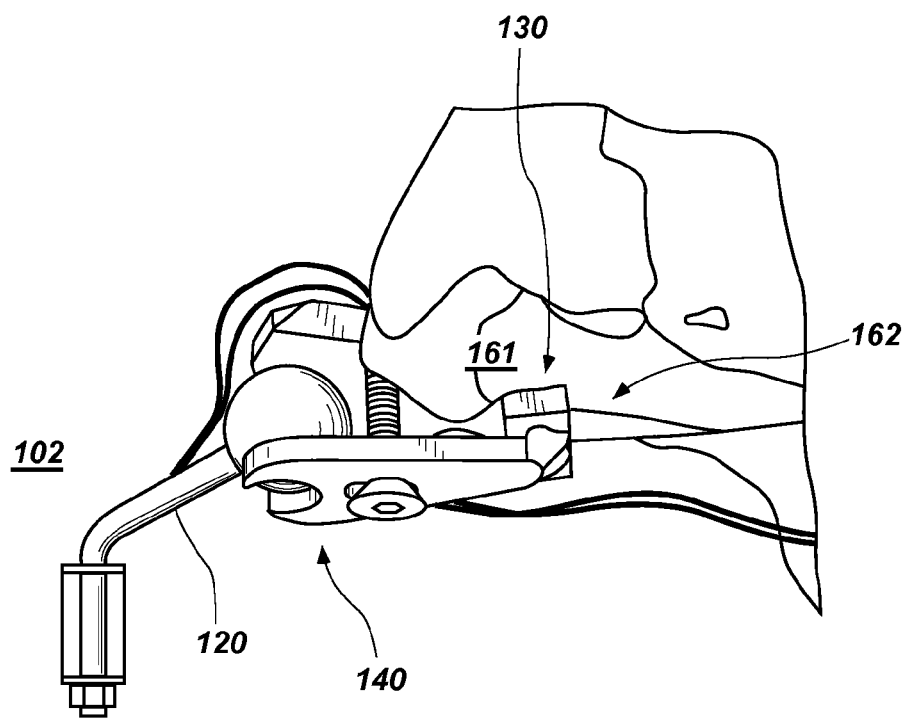
Figure 3A:
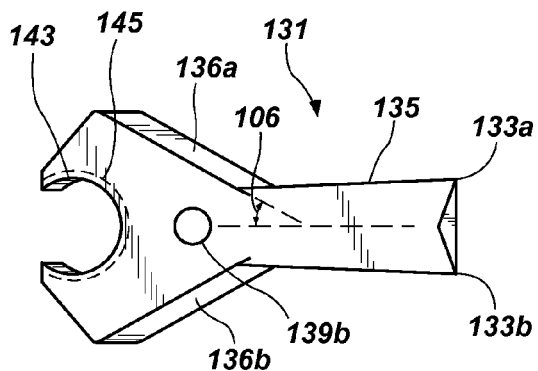
FIGS. 3A-3D illustrate components of the trophy mount of FIGS. 2A-2D.
Figure 3B:
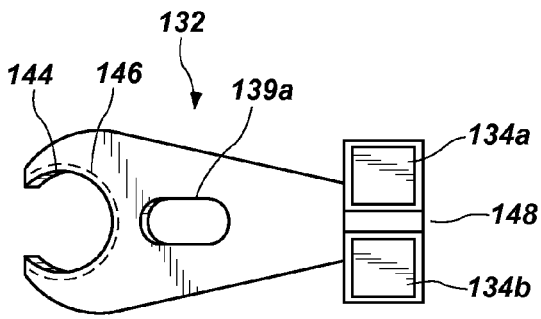
Figure 3C:
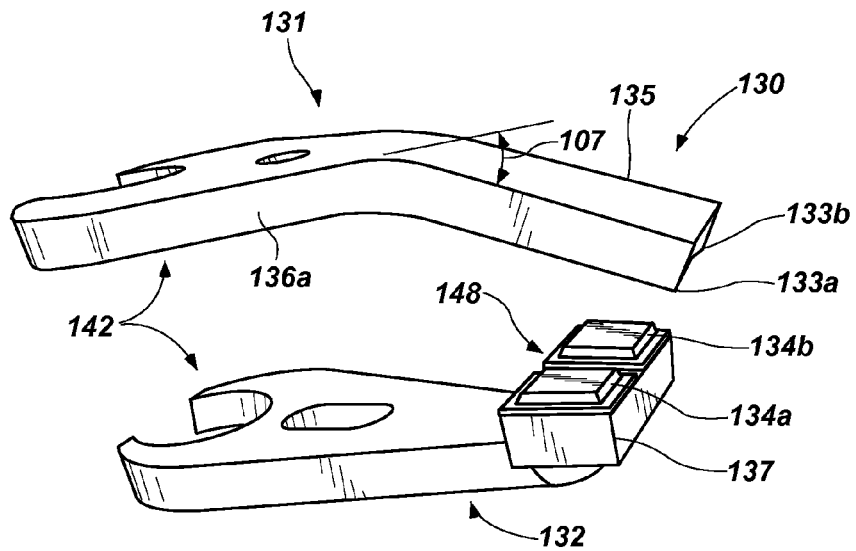
Figure 3D:
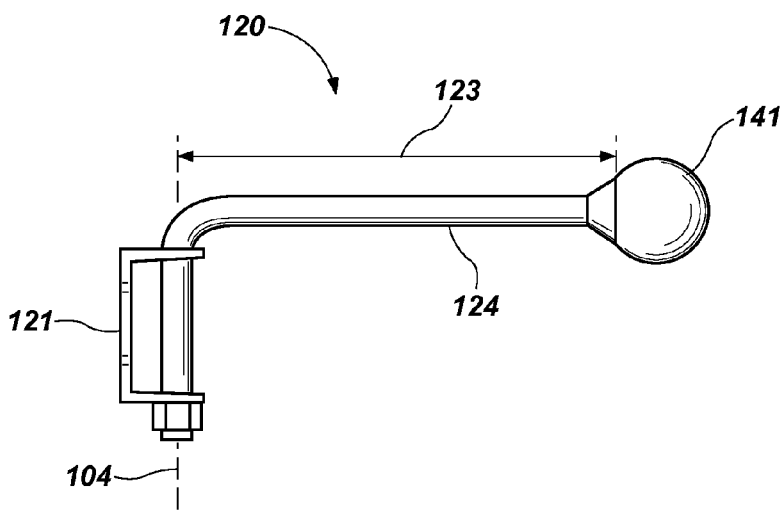
Figure 4A:
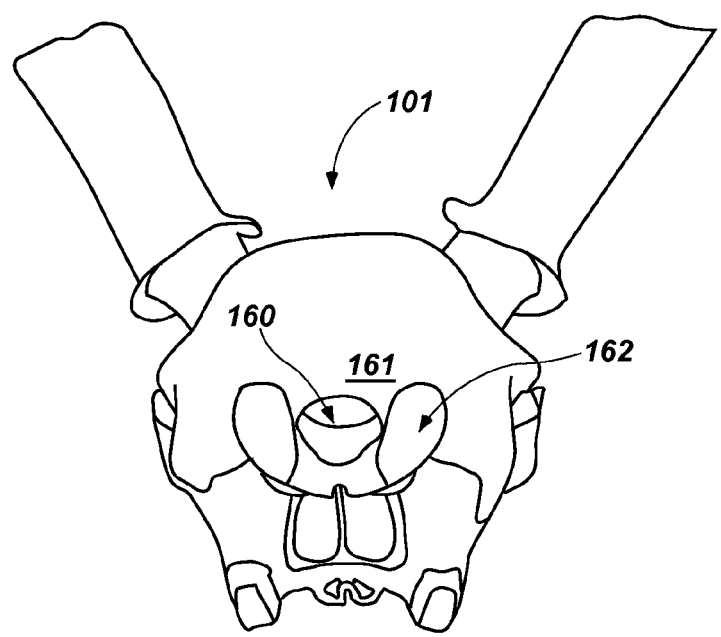
FIGS. 4A and 4B illustrate a skull of the trophy mount system of FIG. 1.
Figure 4B:
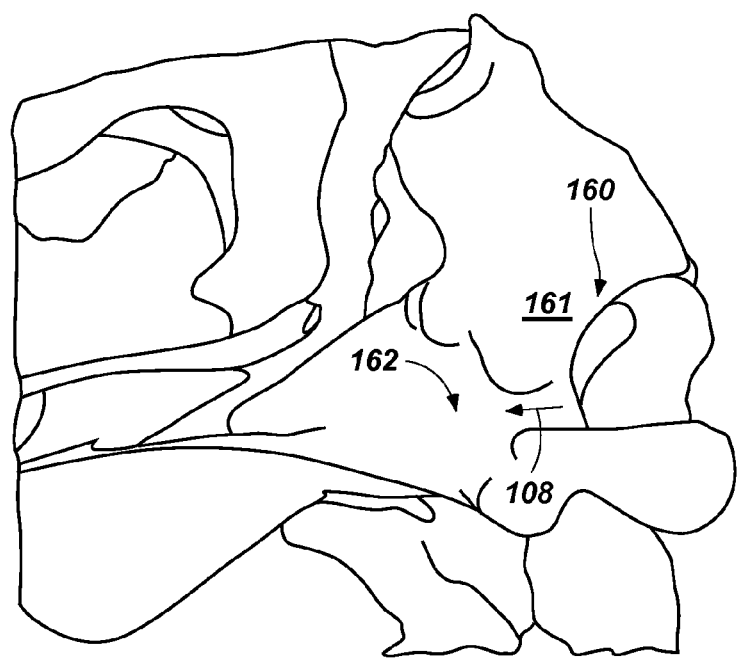

With particular reference to FIGS. 3A-4B, and continued reference to FIGS. 1-2D, certain aspects of the skull coupling feature 130 and positioning device 140 are described. For example, the skull coupling feature 130 can be configured as a clamp and can be configured to secure the skull 101 by utilizing a foramen magnum 160 of the skull. The foramen magnum (Latin for "great hole") is a large opening in the occipital bone of the cranium. It is an oval or circular aperture in the base of the skull (the foramina), through which the spinal accessory nerve, among other things, accesses the skull. The skull coupling feature 130 can include a first jaw 131 configured to extend in a direction 108 into the foramen magnum 160 of an occipital bone 161 of a skull 101 toward a nose end of the skull. The skull coupling feature 130 can also include a second jaw 132 operable with the first jaw 131 to clamp the occipital bone 161 and secure a bottom 162 of the skull 101. In other words, the skull coupling feature 130 can be configured to clamp about a base or bottom 162 of the skull 101.

The first jaw 131 and/or the second jaw 132 can include one or more interface features to bear against portions of the skull 101 to secure the skull 101 when clamped. For example, the first jaw 131 can include interface features 133a, 133b and the second jaw 132 can include interface features 134a, 134b. In one aspect, the interface features 133a, 133b, 134a, 134b can be configured to enhance grip on the skull 101. For example, interface features 133a, 133b each illustrate a geometrical feature, such as a pointed tip, to enhance grip on the skull 101. In another example, interface features 134a, 134b each illustrate a friction enhancing material to enhance grip on the skull 101. In another aspect, the interface features 133a, 133b of the first jaw 131 and/or the interface features 134a, 134b of the second jaw 132 can be separated by a recess or notch to provide for clearance with a ridge that may be present on the skull and to provide for two points of contact with the skull. For example, the interface features 134a, 134b are separated by a recess 148 or notch. In certain embodiments, the first jaw 131 can comprise an elongate portion 135 to extend into the skull 101 through the foramen magnum 160. In one aspect, the interface features 133a, 133b can be located at an end of the elongate portion 135.

In some embodiments, the first jaw 131 can comprise a foramen magnum interface feature 136a, 136b to bear against a portion of the skull 101 about the foramen magnum 160 to stabilize the skull 101 when clamped. For example, the foramen magnum interface feature 136a, 136b can comprise a beveled or angled surface to contact a lower portion of the foramen magnum 160 when clamped. The beveled or angled surface can be configured to provide a contact or bearing surface to enhance stability of the skull 101 when clamped. In addition, the beveled or angled surface can be formed at a taper or angle 106 to wedge against the foramen magnum 160 when clamped.

In one aspect, the elongate portion 135 can position the interface features 133a, 133b and the foramen magnum interface feature 136a, 136b relative to one another to facilitate effective coupling with the skull 101. In another aspect, the elongate portion 135 can facilitate contact between the interface features 133a, 133b and the foramen magnum interface feature 136a, 136b with the skull. For example, an angle 107 of the first jaw 131 can position the elongate portion 135 substantially out of contact with the skull such that only the interface features 133a, 133b and the foramen magnum interface feature 136a, 136b are in contact with the skull. Similarly, the interface features 134a, 134b of the second jaw 132 can be disposed on a riser or pad 137 to suitably position the interface features 134a, 134b, such as to ensure that only the interface features 134a, 134b of the second jaw 132 are in contact with the skull. It should be recognized that the angle 107 and/or the riser or pad 137 can be omitted, as desired, to form a substantially planar first jaw 131 or second jaw 132.

The first jaw 131 and the second jaw 132 can be clamped about the skull 101 by a bolt 138 or other suitable threaded fastener. The bolt 138 can extend through a clearance hole 139a in the second jaw and can be threaded into a threaded hole 139b in the first jaw 131. The clearance hole 139a can be elongated to facilitate relative movement of the bolt 138 while tightening the first and second jaws 131, 132 about the skull 101 to eliminate or reduce a bending moment in the bolt when clamped. Alternatively, one or more spherical washers (not shown) can be used to eliminate or reduce a bending moment in the bolt when clamped.

In some embodiments, elements or components of the positioning device 140 and the skull coupling feature 130 can be integrated into the same structure and/or structures. For example, the socket 142 can comprise a first socket portion 143 of the first jaw 131 and a second socket portion 144 of the second jaw 132. In this configuration, clamping of the first jaw 131 and the second jaw 132 can be operable to clamp the first socket portion 143 and the second socket portion 144 about the ball 141 to facilitate positioning of the skull 101. Thus, the same bolt 138 or fastener can function to simultaneously clamp the skull 101 with the first and second jaws 131, 132 as well as tighten the socket portions 143, 144 about the ball 141. Clamping the first and second jaws 131, 132 about the base or bottom 162 of the skull 101 can therefore position the first and second socket portions 143, 144 "in-line" to interface with the ball 141, such that the single bolt 138 can facilitate both the clamping of the skull 101, and also tightening of the socket portions 143, 144 about the ball 141.

In one aspect, the first and/or second socket portions 143, 144 can have interface or bearing surfaces 145, 146, respectively, configured to interface with the ball 141 and provide a larger surface area in contact with the ball 141. For example, the interface or bearing surfaces 145, 146 can comprise beveled transition surfaces, angled transition surfaces, or any other surface configuration suitable for interfacing with the ball 141 and providing an increase in surface area in contact with the ball 141 over a simple intersection of surfaces defining the socket portions 143, 144 in which the ball 141 would essentially rest on a line. By providing an interface or bearing surface, the ball 141 can rest on a surface having an area, thus providing increased surface area in contact with the ball 141. The interface or bearing surfaces 145, 146 can comprise transition surfaces extending between transverse surfaces. For example, the interface or bearing surfaces 145 can comprise a beveled transition surface that extends between an inside surface of the first socket portion 143 of the first jaw 131 and a surface transverse to the inside surface. The second jaw 132 can comprise a similar bearing surface 146.

In one aspect, the socket portions 143, 144 can be tightened about the ball 141 sufficient to prevent unwanted movement of the skull 101, while permitting the skull 101 to be manipulated and maneuvered without adjusting preload in the bolt 138. In other words, adjustment of a mounting position or orientation can be accomplished by merely repositioning the skull to a desired location and/or orientation. Thus, a user can position and reposition the skull 101 at will without the need to access or adjust any component of the positioning device 140 and/or the skull coupling feature 130. It should be noted that, in some embodiments, the skull coupling device can comprise any type of system or device or method configured to secure, or capable of securing, to a skull. In this case, it is contemplated that various types of skull coupling devices can be configured to be operatively coupled to the positioning device 140, as described above, namely the positioning device as comprising a ball and socket arrangement.

Figure 5:
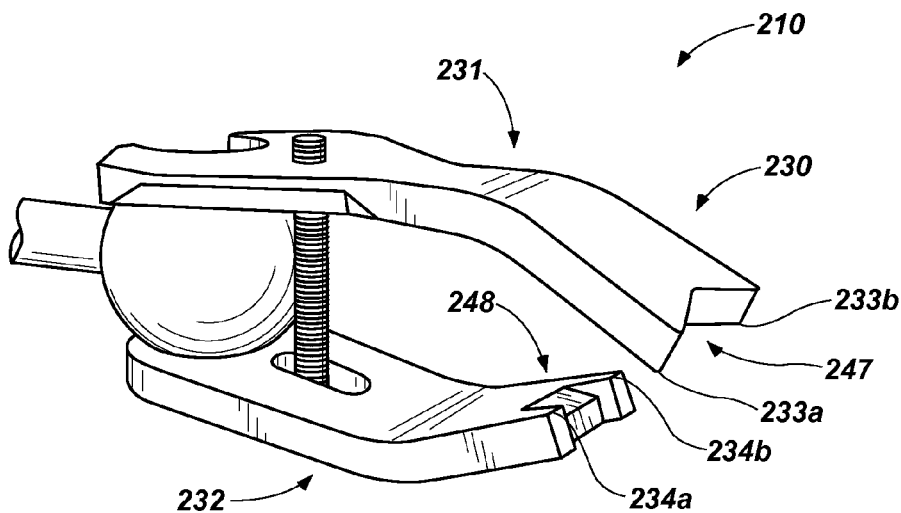
FIG. 5 is an example illustration of a trophy mount, in accordance with another embodiment of the present invention.

FIG. 5 illustrates another embodiment of a trophy mount 210, which is similar in many respects to the trophy mount 110 discussed hereinabove. For example, the trophy mount 210 has a skull coupling feature or clamp 230, which includes a first jaw 231 and a second jaw 232. In addition, the first jaw 231 includes foramen magnum interface features (not both shown, but see foramen magnum interface feature 236a). Interface features 233a, 233b of the first jaw 231 and interface features 234a, 234b of the second jaw 232 are shown separated by a recess or notch 247, 248, respectively, to provide for clearance with a ridge of a skull. The recess or notch 247, 248 can serve to ensure that the ends of each of the first and second jaws 231, 232 have two points of contact with the skull. In this case, the interface features 233a, 233b are configured to have sharp tips formed by three intersecting planar surfaces to grip or secure the skull. The interface features 234a, 234b, on the other hand, are configured to have sharp tips formed by two intersecting planar surfaces and delineated by two parallel planar surfaces.

Figure 6A:
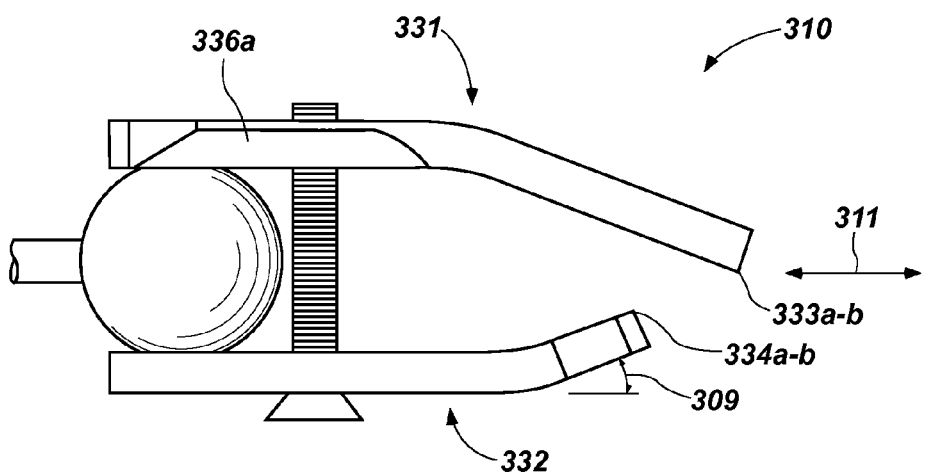
FIGS. 6A and 6B are example illustrations of a trophy mount, in accordance with yet another embodiment of the present invention.
Figure 6B:
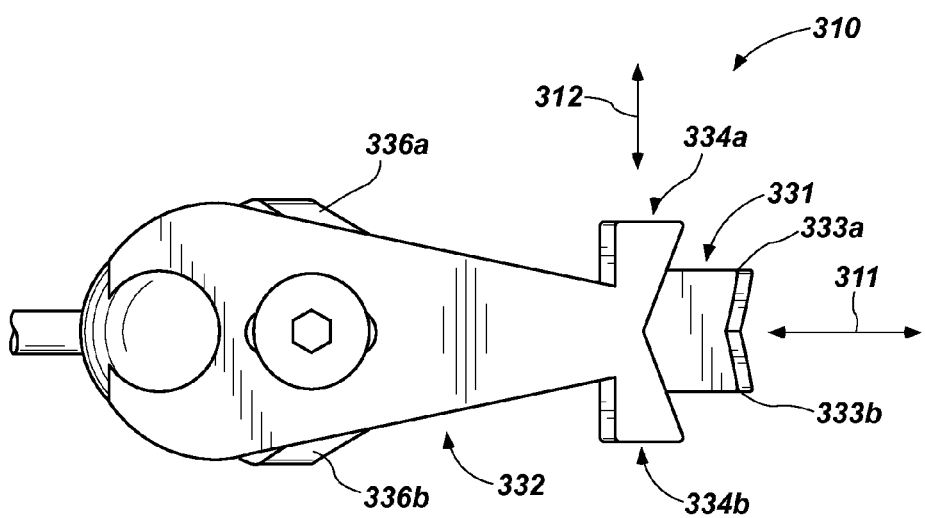

FIGS. 6A and 6B illustrate yet another embodiment of a trophy mount 310, which is also similar in many respects to the trophy mount 110 discussed hereinabove. For example, the trophy mount 310 has a skull coupling feature or clamp 330, which includes a first jaw 331 and a second jaw 332, with each jaw having interface features 333a-b and interface features 334a-b, respectively. In addition, the first jaw 331 includes foramen magnum interface features 336a, 336b. These interface features, as illustrated in the figures, can provide for six points of contact with a skull. In particular, the foramen magnum interface features 336a, 336b and the interface features 333a, 333b of the first jaw 331 provide four points of contact with the skull, and the interface features 334a, 333b of the second jaw 332 provide two points of contact with the skull. In one aspect, the first and second jaws 331, 332 can be configured such that the interface features 334a, 333b of the second jaw 332 contact the skull between the foramen magnum interface features 336a, 336b and the interface features 333a, 333b of the first jaw 331 in a longitudinal direction 311. In another aspect, illustrated in FIG. 6B, the first and second jaws 331, 332 can be configured such that the interface features 333a, 333b of the first jaw 331 contact the skull between the interface features 334a, 333b of the second jaw 332 in a lateral direction 312. Thus, the quantity of interface features and/or the location of the interface features can provide a stable and secure coupling with the skull.

It should be recognized that the various components and elements described herein can be constructed in any suitable manner. For example, the first and/or second jaws 331, 332 can be formed of multiple parts or pieces, or may comprise a single monolithic or unitary structure. In one aspect, the first and/or second jaws 331, 332 can be stamped out of plate stock and bent into a suitable shape. For example, as shown in FIG. 6B, the end of the second jaw 332 having the interface features 334a, 333b can be bent at an angle 309 to suitably position the interface features 334a, 333b. Providing the second jaw 332 with an upwardly bent portion at angle 309 as shown can provide similar functionality for the skull coupling clamp 330 as the riser 137, namely to ensure that the interface features 334a and 334b are in proper and good contact with the skull at the desired, select location.

Referring again to FIGS. 1-3D, the extension arm 120 can be configured to facilitate manipulation of the skull 101 in a range of possible orientations and/or positions. In some embodiments, the extension arm 120 can have a length 123 to position the skull 101, via the positioning device 140 and the skull coupling feature 130, from a support structure such as the base 102. In one aspect, the extension arm 120 can comprise a rod 124 that can be coupled to the base 102 via the bracket 121 disposed at an end of the rod 124. At an opposite end, the rod 124 can be coupled to the ball 141. Thus, elements or components of the extension arm 120 and the positioning device 140 can be integrated into the same structure and/or structures.

In some embodiments, the extension arm 120 can be rotatable about the axis 104 relative to the base 102, such as by a rotatable coupling between the extension arm 120 and the bracket 121. In one aspect, the length 123 of the extension arm 120 can be configured to facilitate manipulation and positioning of the skull 101 when the extension arm 120 is rotated to various positions relative to the base. For example, the length 124 can be selected to be about one-half a length of the skull 101 extending from the nose to the foramen magnum 160. As discussed in more detail with regard to FIGS. 9A and 9B, this can facilitate centering the bracket 121 relative to the skull 101 when the extension arm 120 is rotated to an extreme angle (about 150-180 degrees) relative to the base 102. In one aspect, the length 123 can be variable, such as by a telescoping rod.

In one aspect, the light 150 can be connected to a portion of the skull coupling feature 130, such as to the first jaw 131 and/or the second jaw 132. In some embodiments, the light 150 can be controlled or adjusted via a switch, dial, or other control mechanism associated with the base 102, the extension arm 120, and/or the skull coupling feature 130.

Figure 7A:
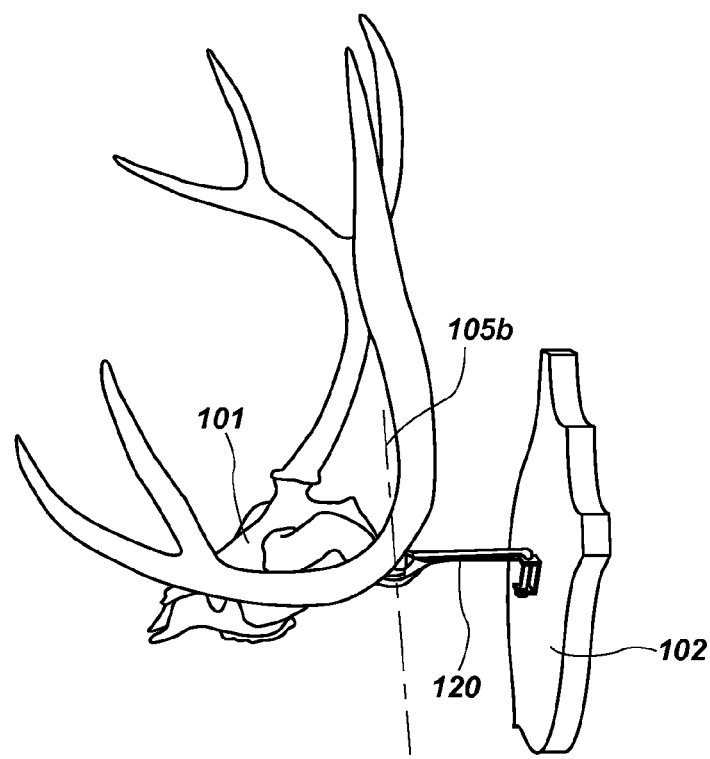
FIGS. 7A-7C illustrate the trophy mount of FIGS. 2A-2D in use, in accordance with an embodiment of the present invention.
Figure 7B:
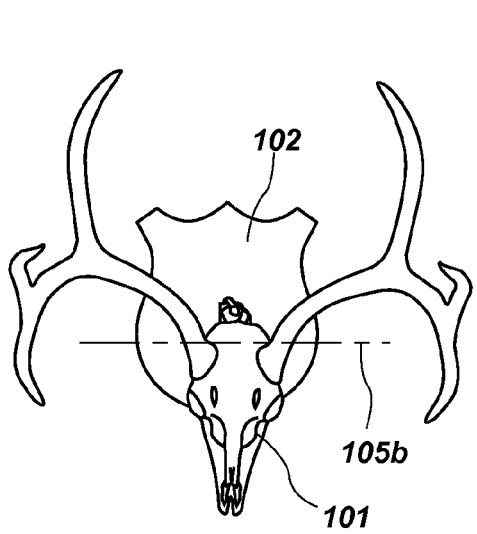
Figure 7C:
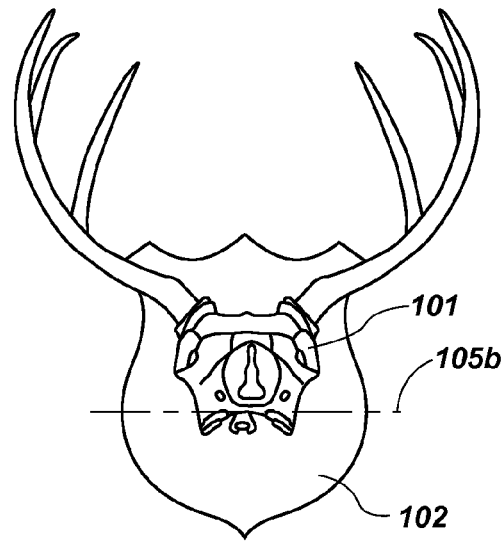

FIGS. 7A-9B illustrate the trophy mount, including the skull coupling feature, in use. For example, FIGS. 7A-7C illustrate the extension arm 120 approximately perpendicular to the base 102 with the skull 101 rotated about the axis 105*b* to orient the nose of the skull 101 downward (FIG. 7B) and upward (FIG. 7C).

Figure 8A:
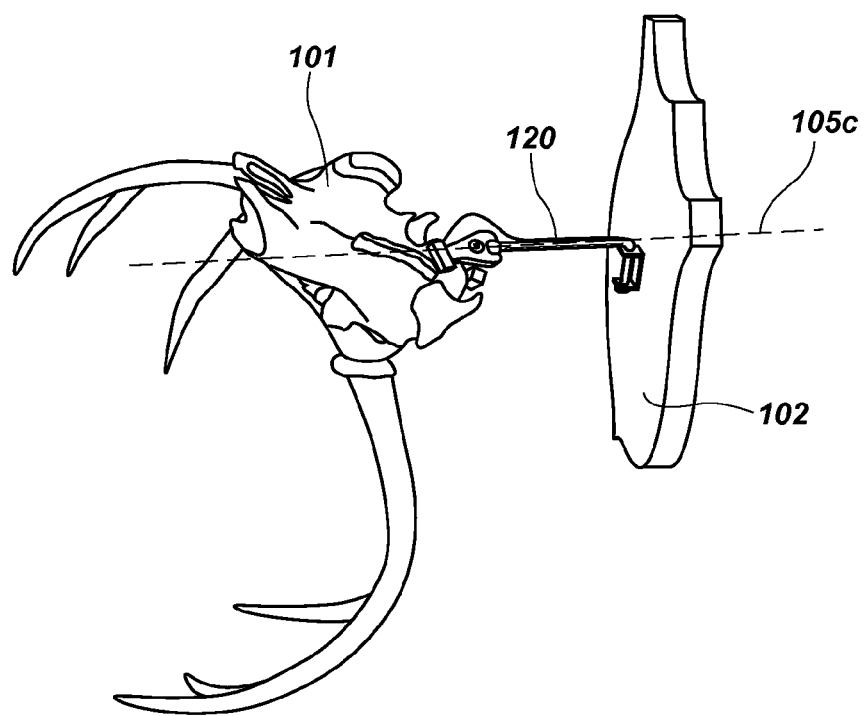
FIGS. 8A and 8B illustrate the trophy mount of FIGS. 2A-2D in use, in accordance with another embodiment of the present invention.
Figure 8B:
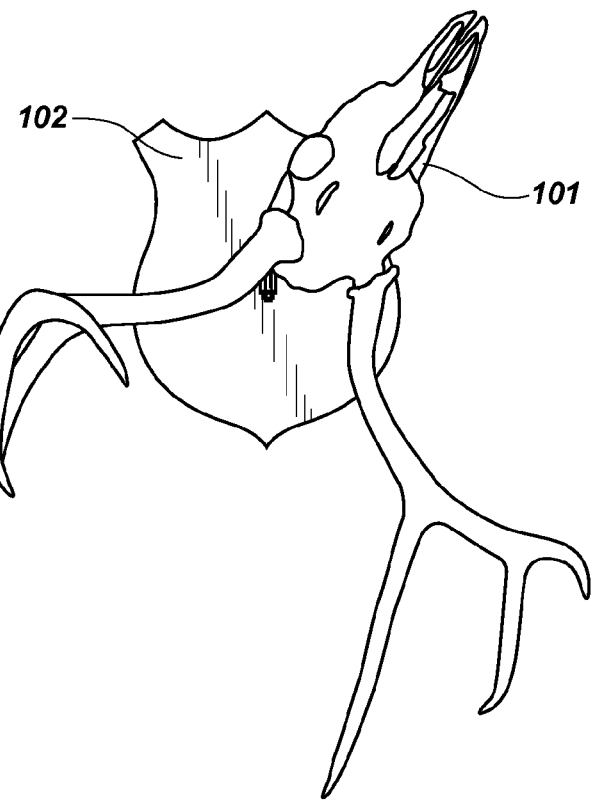

FIGS. 8A and 8B likewise illustrate the extension arm 120 approximately perpendicular to the base 102. However, in these figures, the skull 101 is shown rotated about the axis 105*c* to orient the nose of the skull 101 upward such that the antlers are oriented downward.

Figure 9A:
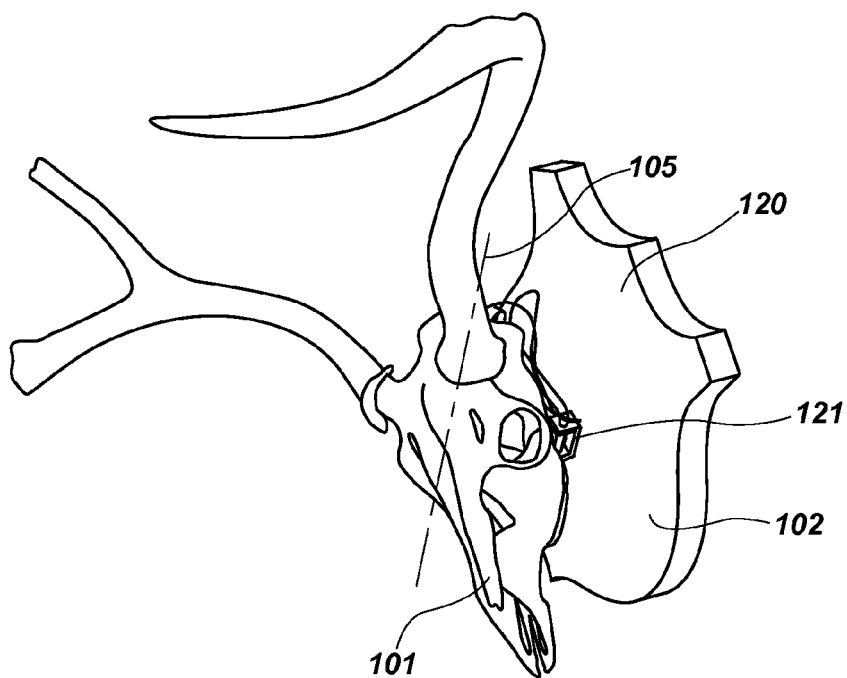
FIGS. 9A and 9B illustrate the trophy mount of FIGS. 2A-2D in use, in accordance with yet another embodiment of the present invention.
Figure 9B:
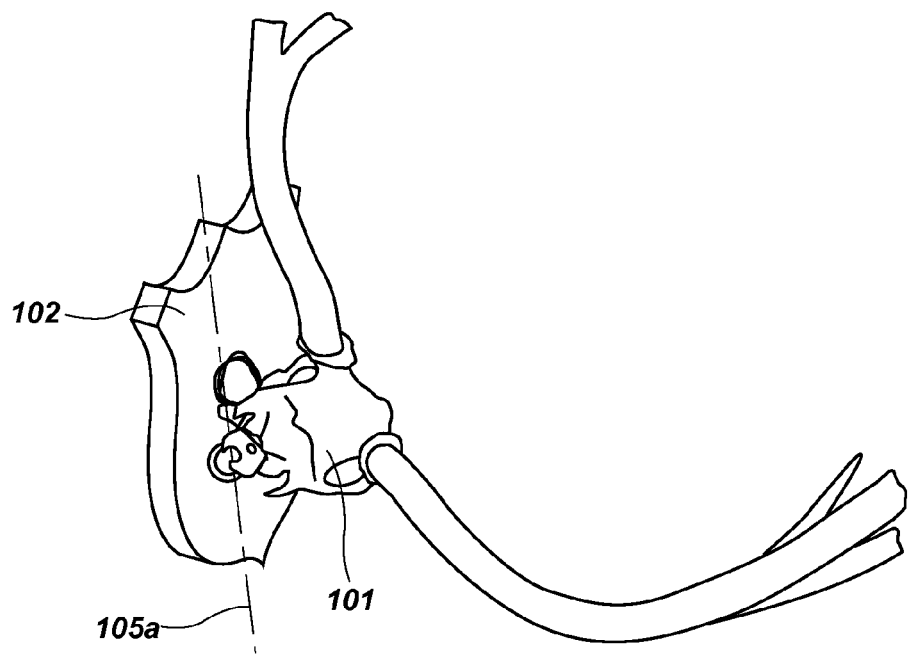

FIGS. 9A-9B illustrate the extension arm 120 at an extreme angle relative to the base 102 to position the rear of the skull to a left side of the base 102. In this case, the skull 101 is shown rotated about the axis 105*a* to position the nose of the skull 101 to a right side of the base 102. Thus, the length 123 of the extension arm 120 can facilitate centering the bracket 121 relative to the skull 101 when the extension arm 120 is rotated to an extreme angle (about 150-180 degrees) relative to the base 102. It should also be recognized that the skull 101 can be centered about the bracket 121 and/or base 102 when the extension arm 120 is not at an extreme angle relative to the base 102.

Figure 10:
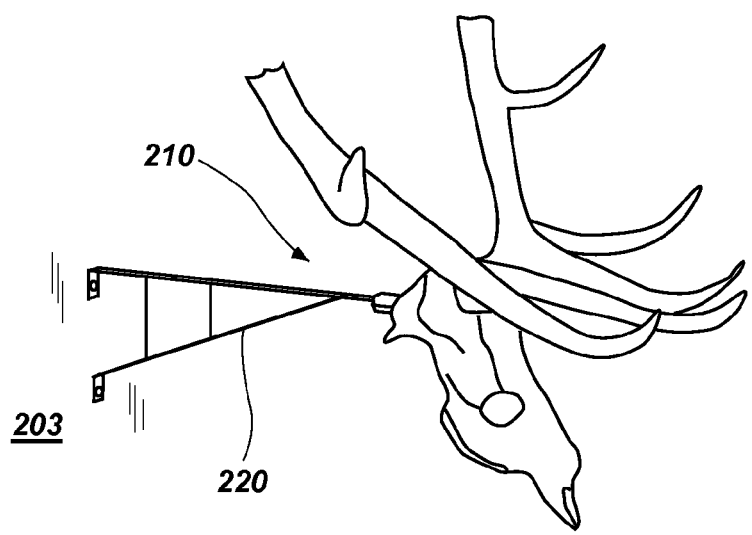
FIG. 10 is an example illustration of a trophy mount, in accordance with another embodiment of the present invention.
Figure 11:
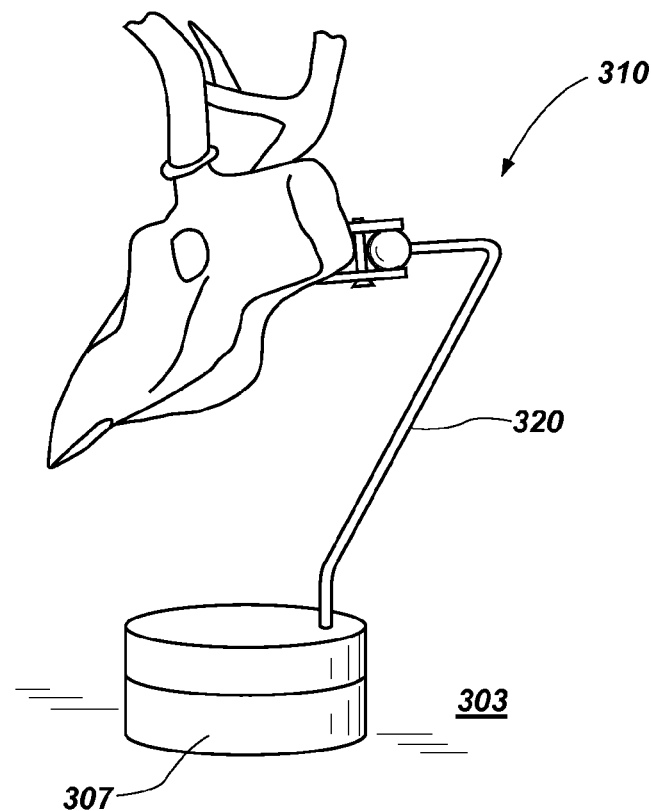
FIG. 11 is an example illustration of a trophy mount, in accordance with yet another embodiment of the present invention.

FIGS. 10 and 11 illustrate additional alternative embodiments of a trophy mount, comprising a skull coupling feature or clamp as disclosed and discussed herein. For example, FIG. 10 illustrates a trophy mount 210 that is similar in many respects to the trophy mount 110 discussed hereinabove. However, the extension arm 220 of the trophy mount 210 comprises a cantilevered truss structure with at least two structural members as opposed to a single rod. This configuration can be beneficial when supporting larger and/or heavier skulls. In addition, the extension arm 220 is shown in a fixed or non-rotatable relationship with the supporting wall 203, although the extension arm 220 may be rotatable relative to the wall 203.

FIG. 11 illustrates a trophy mount 310 that is also similar in many respects to the trophy mount 110 discussed hereinabove. However, the extension arm 320 of the trophy mount 310 is configured to support the skull from a horizontal surface, such as a table 302, as opposed to a vertical surface such as a wall. The extension arm 320 can be coupled to a base 302, which can be weighted to provide a stable support for the skull. The extension arm 320 can extend upward from the base 302 to locate the skull above the base 302. In one aspect, the extension arm can be configured to roughly locate a center of mass of the skull above the base to provide stability and prevent the skull from tipping over. In addition, the extension arm 320 is shown in a fixed or non-rotatable relationship with the base 302, although the extension arm 320 may be rotatable relative to the base 302.

It should be recognized that multiple trophy mounts, as disclosed herein, can be utilized to display a variety of trophies or skulls. In one aspect, two skulls can be located side by side on respective trophy mounts and can be manipulated to have the horns or antlers of the skulls lock up so as to resemble fighting. In addition, a light disposed inside a skull can add an interesting element at night or in low light situations to customize a skull display. Thus, the trophy mounts disclosed herein can be used to quickly and easily configure or reconfigure skulls in a variety of display positions or scenarios.

In accordance with one embodiment of the present invention, a method for securing a skull for display is disclosed. The method can comprise disposing at least a portion of a first jaw through a foramen magnum of an occipital bone of a skull toward a nose end of the skull. The method can further comprise disposing a second jaw opposite the first jaw about the occipital bone. Additionally, the method can comprise clamping the occipital bone between the first jaw and the second jaw. It is noted that no specific order is required in this method, though generally in one embodiment, these method steps can be carried out sequentially.

In one aspect, the method further comprises disposing a foramen magnum interface feature of the first jaw proximate the foramen magnum to bear against the skull about the foramen magnum to stabilize the skull when clamped. In a particular aspect, disposing at least a portion of a first jaw through a foramen magnum comprises extending an elongate portion of the first jaw into the skull through the foramen magnum, the elongate portion having an interface feature to bear against a portion of the skull to secure the skull when clamped, wherein the second jaw comprises an interface feature to bear against a portion of the skull to secure the skull when clamped, and wherein the interface feature of the second jaw is configured to contact the skull between the foramen magnum interface feature and the interface feature of the first jaw in a longitudinal direction.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A skull clamp, comprising:
a first jaw including an elongate portion with an elongate portion end and including a socket portion end; and
a second jaw secured to the first jaw,
wherein the first jaw is longer than the second jaw and the socket portion end of the first jaw includes two beveled surfaces which taper along a length of the socket portion end of the first jaw forming a wedge disposed between the socket portion end of the first jaw and the elongate portion end of the first jaw; and
wherein the first jaw and the second jaw include a void which is at least partially surrounded and defined by bearing surfaces on the socket portion ends of the first jaw and the second jaw defining a positioning device to facilitate rotation of the skull clamp in at least two rotational degrees of freedom.

2. The skull clamp of claim 1, wherein the elongate portion end of the first jaw is configured to extend into a skull through the foramen magnum and the second jaw includes a second clamp interface feature to bear against an external portion of the skull to secure the skull when clamped.

3. The skull clamp of claim 1, wherein the elongate portion end of the first jaw includes a first clamp interface feature to bear against an internal portion of the skull to secure the skull when clamped.

4. The skull clamp of claim 3, wherein the second jaw includes a second clamp interface feature to bear against an internal portion of the skull when clamped.

5. The skull clamp of claim 4, wherein the first clamp interface feature and the second clamp interface feature are implemented as one or more of: one or more risers, one or more pads, one or more recesses, one or more notches, or one or more sharpened tips.

6. The skull clamp of claim 1, wherein the elongate portion end of the first jaw is bent at an angle.

7. The skull clamp of claim 1, wherein the bearing surfaces for the first jaw and the second jaw on the positioning device include beveled transition surfaces between the first jaw and the positioning device and the second jaw and the positioning device.

8. The skull clamp of claim 1, wherein the socket portion end of the first jaw includes a beveled bearing surface defining a void and the socket portion end of the second jaw includes a beveled bearing surface defining a void, and wherein the socket portion end of the first jaw and the socket portion end of the second jaw are further secured to a ball about the respective voids.

9. The skull clamp of claim 1, wherein the wedge disposed between the socket portion end of the first jaw and the elongate portion end of the first jaw is configured to be drawn into a foramen magnum of a skull until the wedge bears against an occipital bone of the skull as the skull clamp is tightened.

10. A trophy mount, comprising:
a skull coupling feature including a first jaw that includes an elongate portion with an elongate portion end and a socket portion end, and further including a second jaw that that is secured to the first jaw and includes a socket portion end, wherein the first jaw and the second jaw are configured to interface with and support a skull, and further wherein the first jaw is longer than the second jaw and the socket portion end of the first jaw includes two beveled surfaces which taper along a length of the socket portion end of the first jaw forming a wedge disposed between the socket portion end of the first jaw and the elongate portion end of the first jaw; and
a positioning device including a ball about which the socket portion end of the first jaw and the socket portion end of the second jaw are secured, the positioning device providing rotation of the skull in at least two rotational degrees of freedom.

11. The trophy mount of claim 10, wherein the socket portion end of the first jaw and the socket portion end of the second jaw include a void which is at least partially surrounded and defined by bearing surfaces for the first jaw and the second jaw on the ball of the positioning device.

12. The trophy mount of claim 11, wherein securing the second jaw to the first jaw secures the socket portion end of the first jaw and the second socket portion end of the second jaw to the ball and clamps the skull between the first jaw and the second jaw.

13. The trophy mount of claim 12, wherein the socket portion end of the first jaw includes a beveled transition surface that extends between an inside surface of the socket portion end of the first jaw and a surface transverse to the inside surface to interface with the ball.

14. The trophy mount of claim 12, further comprising a threaded fastener that secures the first jaw to the second jaw, the first and second jaw to the ball, and that clamps the skull between the first jaw and the second jaw.

15. The trophy mount of claim 12, wherein clamping of the first jaw and the second jaw includes the first jaw bearing on a surface inside the skull and the second jaw bearing on a surface outside the skull to secure the skull to the trophy mount.

16. A trophy mount, comprising:
a skull clamp, including:
a first jaw including an elongate portion with an elongate portion end and including a socket portion end;
a second jaw secured to the first jaw,
wherein the first jaw is longer than the second jaw and the socket portion end of the first jaw includes two beveled surfaces which taper along a length of the socket portion end of the first jaw forming a wedge disposed between the socket portion end of the first jaw and the elongate portion of the first jaw; and
a positioning device including a ball around which the socket portion end of the first jaw and the socket portion end of the second jaw ride to provide rotation of the skull clamp in at least two rotational degrees of freedom.

* * * * *